Sept. 9, 1969     M. T. ROUDEBUSH     3,465,655
POSITIONING APPARATUS
Filed March 31, 1967     2 Sheets-Sheet 1
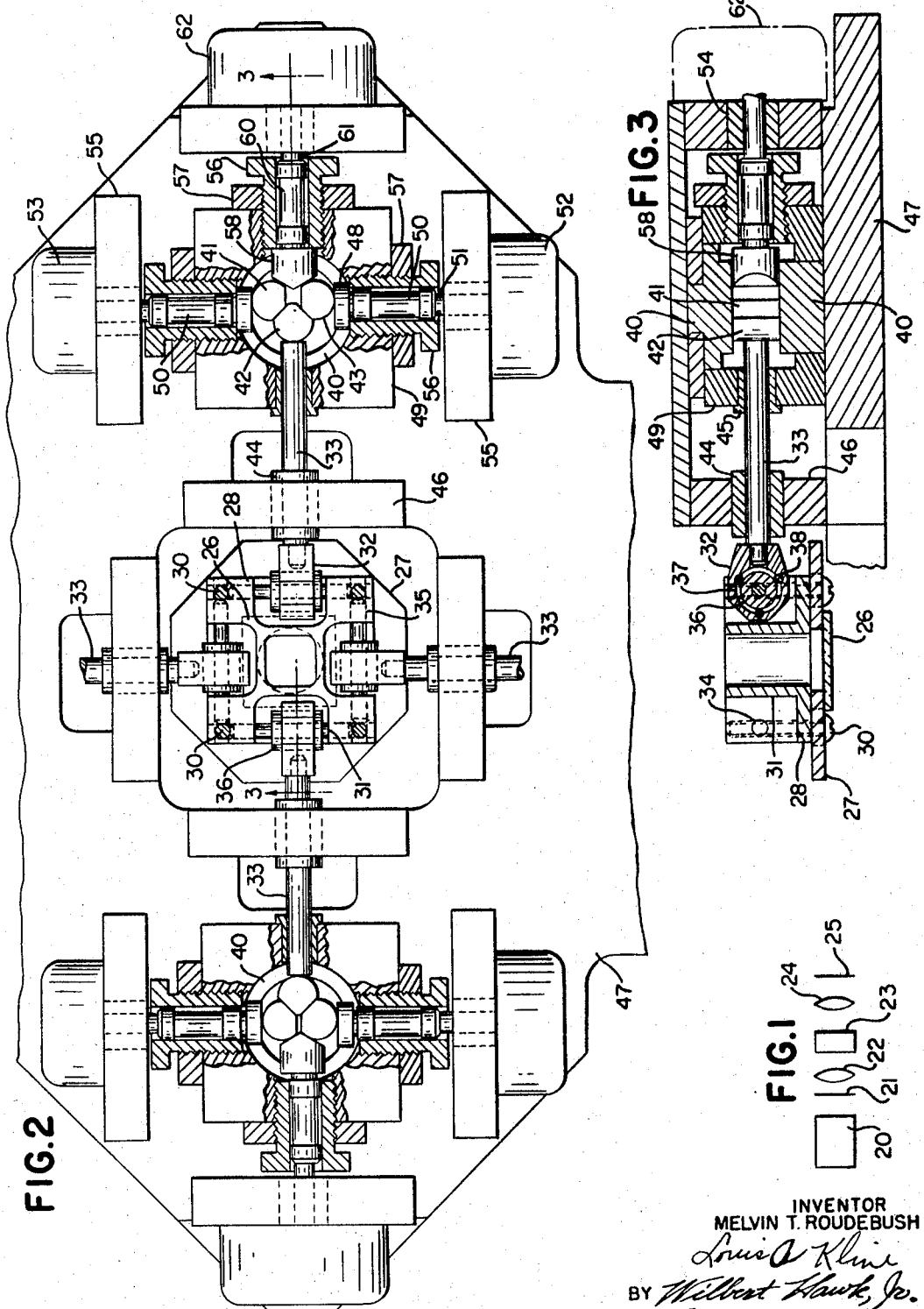
INVENTOR
MELVIN T. ROUDEBUSH
BY
HIS ATTORNEYS Sept. 9, 1969  M. T. ROUDEBUSH  3,465,655
POSITIONING APPARATUS Filed March 31, 1967  2 Sheets-Sheet 2

INVENTOR
MELVIN T. ROUDEBUSH

BY

HIS ATTORNEYS

United States Patent Office 3,465,655
Patented Sept. 9, 1969

3,465,655
POSITIONING APPARATUS
Melvin T. Roudebush, Dayton, Ohio, assignor to The National Cash Register Company, Dayton, Ohio, a corporation of Maryland
Filed Mar. 31, 1967, Ser. No. 627,541
Int. Cl. B41b *17/06*
U.S. Cl. 95—4.5                5 Claims

ABSTRACT OF THE DISCLOSURE

A mechanism for positioning a character-containing printing mask along an *x* and *y* axis. The mask is moved along each of the axes by a pair of solenoid members operating in a push-pull relationship, each of which is selectively positioned by the movement of a plurality of wedge-shaped cam members. Each cam member is moved in relation to the other cam member a distance which corresponds to one of the binary digits 1, 2, or 4.

Cross-references to related applications

Information-Processing System Using Lasers; United States patent application Ser. No. 549,281, filed May 11, 1966, by Carl O. Carlson et al.

Background of the invention

The invention is directed to a positioning mechanism for positioning a mask along an *x* and *y* axis. Prior devices have had to rely on rack-and-pinion mechanism, an example of which is disclosed in the co-pending United States patent application of Carl O. Carlson et al., Ser. No. 549,281, filed May 11, 1966. Other mechanisms used include screw actuator and hydraulic mechanisms. Each of these mechanisms requires that the system return to the home position before the next positioning operation is to occur. Also, the mechanisms are complex, with their tolerances of construction very critical. It is therefore an object of this invention to provide a positioning mechanism which is capable of moving directly from one operated position to another without going through its home position and which is simple in operation and construction.

Summary of the invention

A mechanism for moving a character-containing printing mask which includes a plurality of actuating members each selectively positioned by the movement of a cluster of wedge-shaped cam members in engagement with each other. Each cam member is moved a distance commensurate with one of the binary digits 1, 2, or 4. The actuating member is moved a distance commensurate with the movement of each of the cam members. Two of the cam members are moved in a direction perpendicular to the axis of movement of the actuating member.

Brief description of the drawings

FIGURE 1 is a schematic representation of the basic printing system in which the invention is utilized.

FIGURE 2 is a partial detailed front view of the mask showing two of the four positioning mechanisms.

FIGURE 3 is a sectional view taken on line 3—3 of FIGURE 2.

Description of the preferred embodiment

Figure 4:
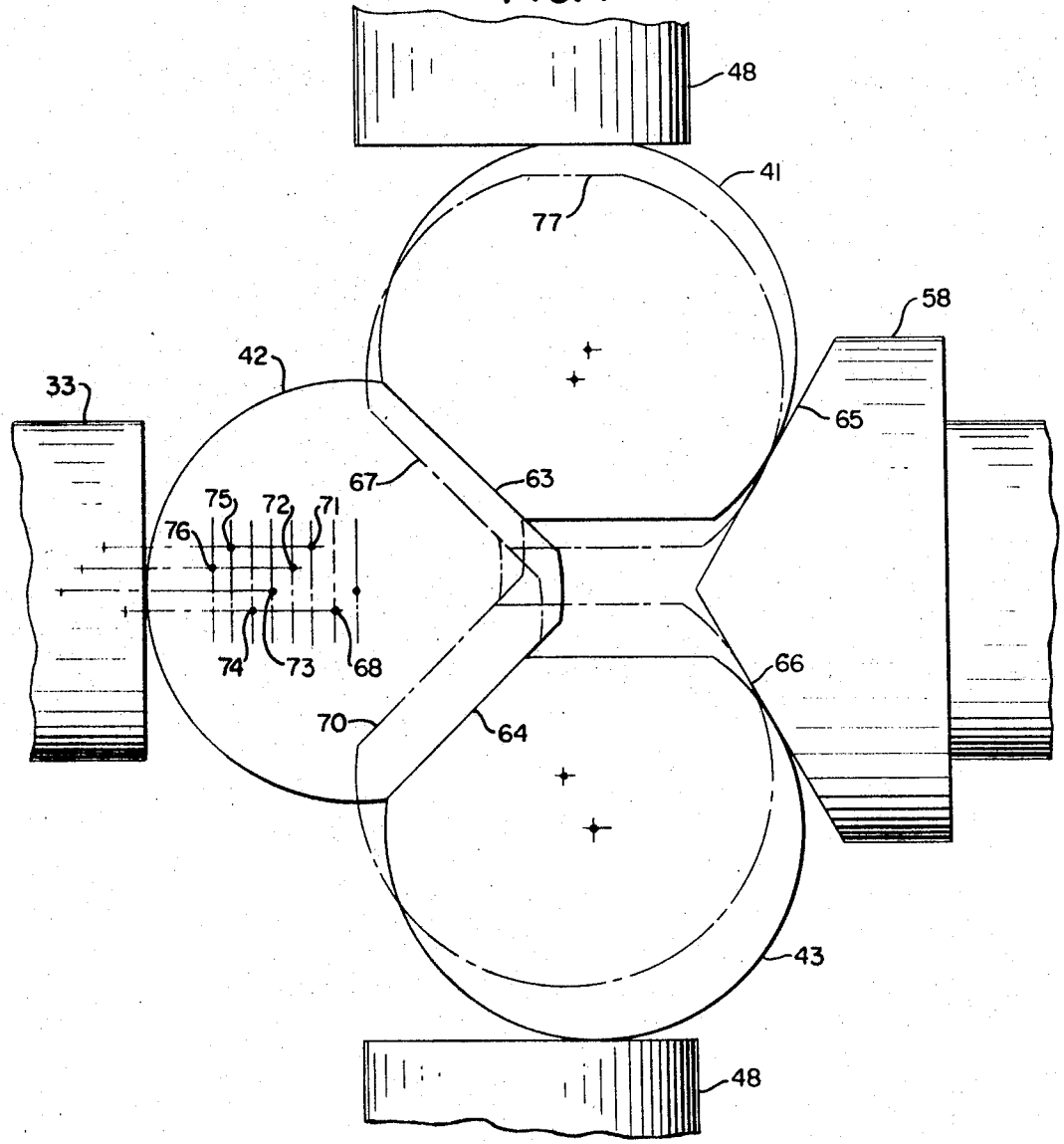
FIGURE 4 is a partial detailed view of the cams used in each of the positioning mechanisms.

Referring now to FIGURE 1, there is shown a schematic representation of the printing system in which the present invention is utilized. Included in this system are a laser beam source 20, a shutter 21, a reducing lens 22, a shiftable mask 23, on which forty-nine character positions are located, a second reducing lens 24, and the recording film 25, on which is located a chemical coating sensitive to light radiation. Reference should be made to the co-pending United States patent application of Carl O. Carlson et al., Ser. No. 549,281, filed May 11, 1966, for a more complete disclosure of a laser operating printing system. Under this system, the laser beam emitted from the source 20 will, upon opening of the shutter 21, travel through the focusing lens 22 to the mask 23. The mask, under the control of a keyboard device (not shown), will be positioned to allow a character located thereon to intercept the laser beam. The laser beam now formed in the outline of the character so intercepted will be focused on the recording film 25 by the lens 24. The recording film includes a dye-containing coating which, upon application of the laser beam, produces a color change to print the character so transmitted by the beam on the coating. Reference should be made to United States Patents Nos. 3,072,481, issued Jan. 8, 1963, on the application of Elliot Berman and Helmut Schwab, and 3,100,778, issued Aug. 13, 1963, on the application of Elliot Berman, for an example of dye compounds that may be used in the coating.

Referring now to FIGURES 2 and 3, there is shown a detailed view of the mask and the mechanism for positioning the mask so that the character to be printed will be positioned to intercept the laser beam. The mask consists of a glass plate 26 (FIGURES 2 and 3), on which is deposited an opaque photographic emulsion which forms the outline of forty-nine numerical and alphabetical characters on the plate. The glass plate 26 is bonded to a support 27, which is in turn mounted to a platform 28 by means of four screws 30. The platform 28 has four cut-out portions 31, in each of which is positioned the head portion 32 of the push rod 33 of an associated positioning mechanism. Located in the platform 28 are four holes 34, in each of which is located a shaft 35, slidably positioned within a bushing 36, mounted on one of the head portions 32 of the push rods 33. The bushings 36 of two of the push rods 33 are mounted within a cut-out area 37 (FIGURE 3) of the head portion 32 by means of rubber bearings 38. The bushings 36 of the push rod 33 opposite to the push rod having the rubber bearing are journaled within the head portion 32 directly. During the operation of both opposite push rods, the rubber bearing 38 acts to absorb any inertia or rebound action that is present in the system. It will be seen from FIGURE 2 that the platform 28, together with the shaft 35, slides on the bushings 36 in either of two directions which are perpendicular to each other. The mounting screws 30 of the support 27 act as stop members for the shaft 35, thus insuring that the platform 38 and the shaft 35 will move as a unit.

As shown in FIGURE 2, there are four push rods 33, which engage the platform 28 to move the platform 28 and the mask 23 along a path composed of separate movements in either of two directions, which are characterized as the *x* and *y* axis. The movement of each of the push rods 33 is controlled by a positioning mechanism, two of which are shown in FIGURE 2. Since the construction and operation of each positioning mechanism are the same, the description of only one of the mechanisms will now be given.

As shown in FIGURES 2 and 3, mounted between a pair of guide blocks 40 are three wedge-shaped cams, 41, 42, and 43. The cam 42 engages one end of the push rod 33, which is slidably supported in bearings 44 and 45. The bearings are mounted on support blocks 46 and 49, which in turn are mounted on a support frame 47. The other end of the push rod 33 engages the head portion 32 of the push rod.

Each of the cams 41 and 43 is engaged by the flat head portion 48 of a plunger 50, which in turn is engaged by the end of the armature 51 of solenoids 52 and 53. The solenoids 52 and 53 are secured to the support blocks 55, mounted on the support frame 47. The plunger 50 associated with each of the cams 42, 43 is positioned within an adjusting screw 56, mounted in the support block 49 by a lock nut 57. The end of the adjusting screw engages the head 48 of the plunger 50 to position the plunger and its associated cam in their home position. This allows for the exact positioning of the cams 41, 43 with relation to the cam 42.

Engaging both of the cams 41, 43 is a drive head 58, mounted on the plunger 60, which in turn in engaged by the end of the armature 61 of a solenoid 62. The plunger 60 is positioned within the adjusting screw 56, which in turn is secured to the support block 49 by means of the lock nut 57 in the manner described above with relation to the plunger 50. It will be seen from this construction that, upon energization of any of the solenoids 52, 53, and 62, the cams 41, 43 and the drive head 58 will be moved by the operation of its associated armatures.

Referring now to FIGURE 4, there is shown an enlarged detailed view of the cams 41, 42, and 43 and the drive head 58. The cam 42 has a pair of inclined surfaces 63, 64, which are inclined at an angle of forty-five degrees with the axis of movement of the push rod 33. Each of these surfaces engages a similar inclined surface located on the cams 41, 43. The drive head 58 has a pair of inclined surfaces 65, 66, which engage the cams 41, 43, respectively. The surfaces 65, 66 are inclined sixty degrees to the axis of movement of the push rod 33.

The solenoid 52 (FIGURE 2), when energized, moves the plunger 50 a predetermined unit distance perpendicular to the axis of movement of the push rod 33. As the plunger 50 moves downwardly, the cam 41 is cammed to the position indicated by the dotted line 67. This movement is due to the action of the cam on the inclined surface 65 of the drive head 58, which remains stationary at this time. This movement of the cam 41 is transmited to the cam 42, whose center point moves to the position indicated as 68. The cam 42 slides along the surface 64 of the cam 43 during this operation. The movement of the cam 42 along the face of the push rod 33 results in the push rod being moved a unit distance long its axis of movement.

The solenoid 52 (FIGURE 2), when energized, moves the cam 43 upwardly a distance which is twice that of the movement of the cam 41. This position is indicated by the dotted line 70. The movement of the cam 43 is the same as that of the cam 41, and this action on the cam 41 moves the center point of the cam to the point indicated as 71. If both cams 41, 43 are moved simultaneously, the result will be cumulative, and the center point of the cam 42 will have moved three unit distances along its axis of movement.

The solenoid 62, when energized, moves the drive head 58 four unit distances. This movement includes the cams 41, 42, and 43. The center point of the cam 42 will be at the point indicated as 73. Thus the push rod 33 will be moved four unit distances. If both the drive head 58 and the cam 41 are actuated, the cam 42 will be moved five unit distances to the point indicated as 74, while the point 75 indicates the movement of the drive head 58 and the cam 43 a distance of six unit distances. The point 76 indicates the movement of both cams 41, 43 and the drive head 58, which moves the push rod 33 seven unit distances. Thus it can be seen that the push rod 33 can be moved to any one of seven unit distances, depending on the combination of solenoids that are energized.

It is obvious that the unit of distance can be varied by changing the angle of inclination of the surfaces 63 of the cams 41, 42, and 43 and the surfaces 65 of the drive head 58. Also, the cams and the drive head can be of circular construction. The top of the cam 41 has a flat area 77, which engages the flat head portion 48 of its associated drive member. This allows the cams 41, 42, and 43 to remain in a stable condition throughout the operation of the solenoids.

Since the operation of the solenoids 53, 52, and 62 results in the movement of the push rods 33 of one, two, and four unit distances, respectively, the control of the solenoids can be designated as functions of binary digits. Thus each of the characters on the mask is assigned a pair of binary numbers which indicates its position on the mask in terms of unit distances along the $x$ and $y$ axis. The keyboard control unit (not shown), which controls the operation of the solenoids, contains a number of key members, each of which is assigned one of the characters that is located on the mask. Upon depression of a particular key on the keyboard, electrical pulses will energize the particular solenoids representing the binary number of the location of the character that is to be printed. Since there are two positioning mechanisms on each opposite side of the mask 26, the electrical pulses generated by the keyboard will operate the corresponding solenoids of the opposite positioning mechanism in a push-pull manner. Thus, when the push rod on one side of the mask is in one position, the opposite push rod is in a complementary position.

Since the home position of the push rod 33 is considered the No. 1 position, the maximum movement of the push rod for this configuration is six unit distances, there being only forty-nine characters on the mask. This positions the center point of the cam 42 at the point indicated as 75. One advantage of the present positioning system is that, when the mask is moved from one character position to another character position, the mask is moved directly to the new position without the requirement of returning to its home, or No. 1, position. This latter requirement is necessary when screw actuators or other types of mechanical positioning mechanisms are used.

It is obvious that the invention allows very exact positioning of the mask. Depending on the configuration of the cams and the length of stroke of the solenoid armatures, the length of movement of the mask can be varied to fit the needs of the system used.

While there have been shown, described, and pointed out the fundamental novel features of the invention as applied to the preferred embodiment, it will be understood the various omissions, substitutions, and changes in the form and details of the device illustrated and its operation may be made by those skilled in the art without departing from the spirit of the invention. It is the intention, therefore, to be limited only as indicated by the scope of the following claims.

What is claimed is:

1. In a printing mechanism which includes an energy-emitting source, a shutter, a mask containing a plurality of characters to be printed, an energy-absorbing medium, and lens means for focusing rays of energy on a portion of said mask, a device for selectively positioning said mask to align one of the characters with said focused energy rays to print the selected character on said medium, including a member supporting the mask mounted for movement along an $x$ and $y$ axis;

a plurality of actuating means for moving said supporting member a predetermined distance along said $x$ and $y$ axis, each of said actuating means including an output member engaging said supporting means and adapted, when actuated, to move said supporting member along one of said axes;

a first cam member engaging said output member, said cam member being mounted for movement in any direction in the plane of movement of said output member and having a pair of cam surfaces positioned at an angle of less than 180 degrees to each other;

a second cam member mounted for movement along the axis of movement of said output member and having a pair of inclined surfaces;

third and fourth cam members mounted opposite to each other and wedged between said first and second cam members, said third and fourth cam members being adapted for movement in any direction in the plane of movement of said output member and each having a plurality of cam surfaces engaging one of the cam surfaces of said first cam member and an inclined surface of said second cam member;

a first drive means engaging said second cam member to move all of said cam members and said output member a predetermined distance along the axis of movement of said output member;

second and third drive means engaging said third and fourth cam members, respectively, to selectively move said cam members towards each other a predetermined distance, the movement of said cam members moving said output member a distance commensurate to the movement of said cam members;

and control means connected to each of said drive means to selectively operate each of said drive means whereby said output member positions the mask a distance along the axis of movement commensurate with the movement of said cam members.

2. The printing mechanism of claim 1 in which the inclined surfaces of said second cam member are mounted at an angle of less than 180 degrees to each other, thereby forming a pair of V-shaped areas with the cam surfaces of said first cam member within which are positioned said third and fourth cam members.

3. The printing mechanism of claim 1 in which the cam surface of said third and fourth cam members and the cam surface of said first cam member are rectilinear and are in slidable contact with each other, said third and fourth cam members also containing arcuate portions which engage the inclined surfaces of said fourth cam member, whereby, upon movement of said third and fourth members, said first cam member will be moved a predetermined distance.

4. The printing mechanism of claim 1 in which the cam surfaces of said first cam are inclined at an angle of 45 degrees to the axis of movement of said output member.

5. The printing mechanism of claim 1 in which the inclined surfaces of said second cam member form an angle of 60 degrees with the axis of movement of said output member.

References Cited

UNITED STATES PATENTS 2,616,330   11/1952   Westover _____ 95—4.5 XR
3,191,167   6/1965   McNaney.
3,200,927   8/1965   Ryan _____ 340—347 XR JOHN M. HORAN, Primary Examiner LEO H. McCORMICK, Jr., Assistant Examiner U.S. Cl. X.R.

340—347; 235—154; 74—110